United States Patent Office 3,471,943
Patented Oct. 14, 1969

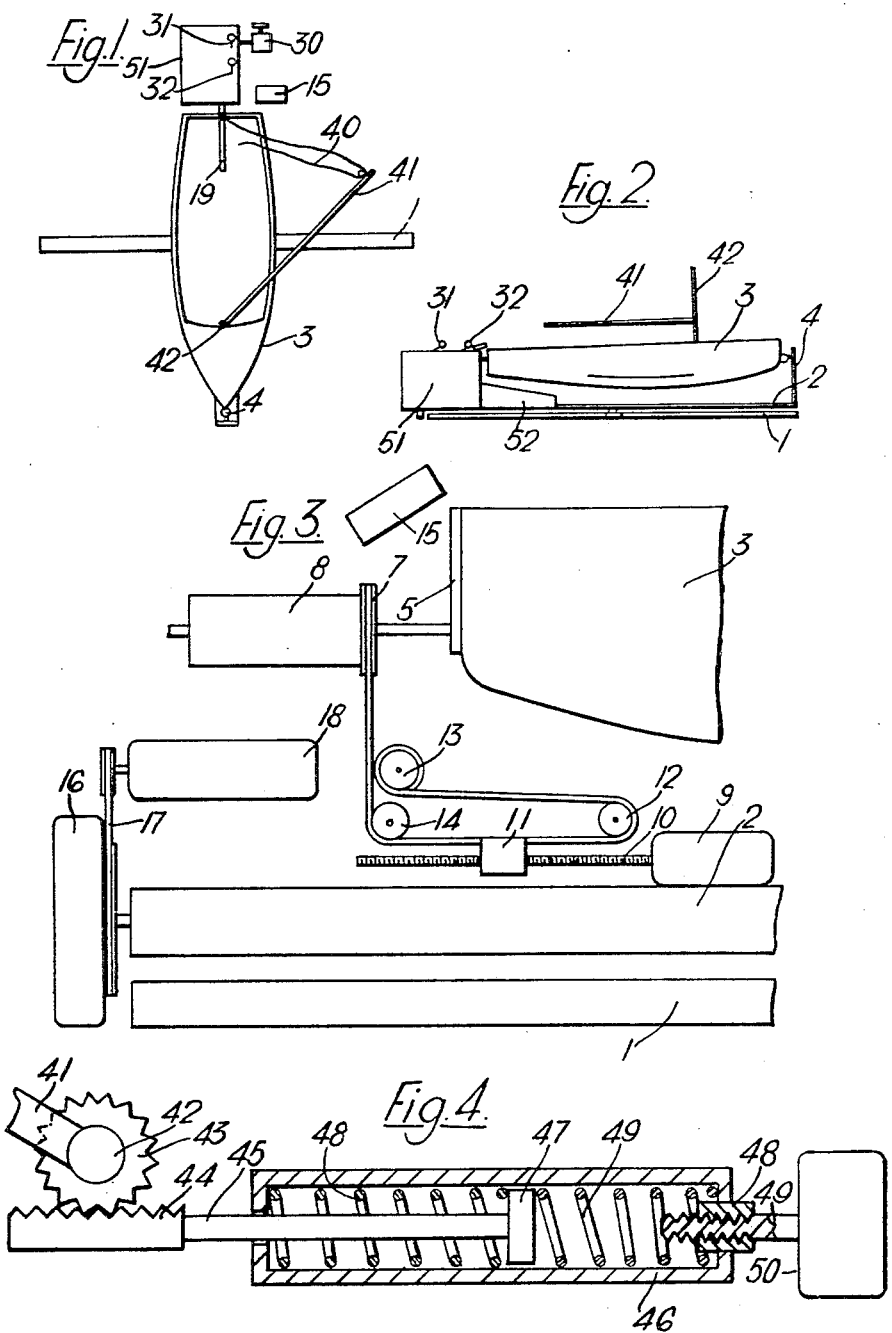

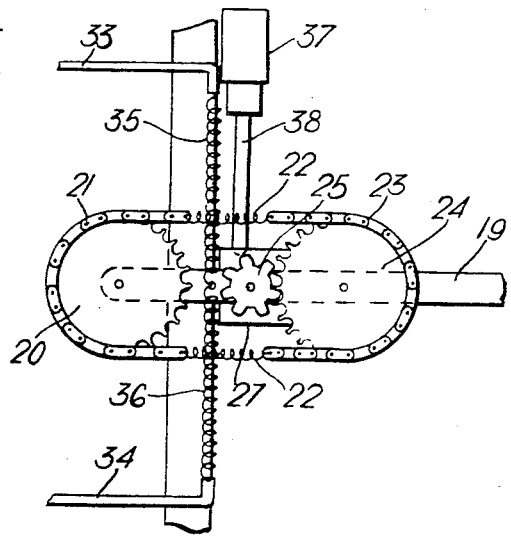
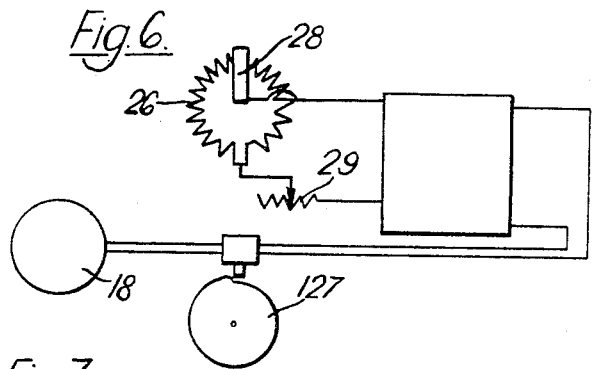
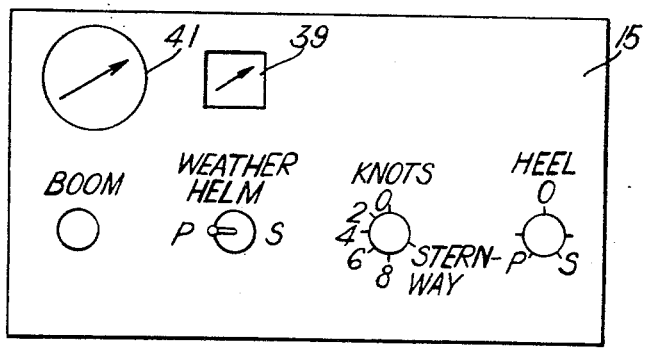

3,471,943
TRAINING DEVICES
Rogor Strange Waddington and Bruce Duval, Lausanne, Switzerland, assignors to T.P.I. Limited, Nassau, Bahamas, a Bahamian company
Continuation of application Ser. No. 518,688, Jan. 4, 1966. This application Nov. 13, 1968, Ser. No. 775,559
Claims priority, application Great Britain, Jan. 7, 1965, 825/65
Int. Cl. G09b 9/06
U.S. Cl. 35—11                  13 Claims

ABSTRACT OF THE DISCLOSURE

A simulator rotatable about a fixed point and also mounted for heeling rotation, but requiring no wind for its operation, provides a sailing craft simulator through which one can learn about the art of sailing. The heeling motion is produced by powered heeling means. The simulator has a main sheet operable by the pupil against a variable loading controller, and a heeling controller and the loading controller are operable by an instructor or by automatic means to simulate the natural heeling and main sheet loading of a sailing craft. The main sheet may be loaded resiliently to give the feel of an actual main sheet, the mounting for heeling rotation may be made resilient so that the pupil's movements affect the degree of heel, the zero position of the helm may be made variable to simulate the conditions of lee and weather helm and the stiffness and sensitivity of the helm may be made variable to simulate the changes of stiffness and sensitivity encountered in actual sailing upon water.

The application is a contination of application Ser. No. 518,688, filed Jan. 4, 1966, now abandoned.

The present invention relates to training devices and has as an object the provision of a sailing simulator.

It is known to provide sailing craft simulators with which a pupil can learn something of the art of sailing without leaving dry land. Taylor, U.S. Patent No. 2,855,702, for example, describes a version of a land vehicle propelled by the wind on sails, and Rousseau, U.S. Patent No. 2,208,083, describes a vehicle which though not movable from place to place by the wind is rotatable about a fixed point in response to a helm so that it changes its heading relative to the wind. Both Taylor and Rousseau show mounting the vehicle or a part thereof for heeling rotation about a fore-aft axis in response to the effect of the wind upon sails, thereby to provide an improved approach to the behavior of an actual sailing craft.

In accordance with the present invention there is provided a sailing simulator which comprises a hull mounted for rotational movement about a vertical axis and about a fore-aft axis, driving means moving the hull to and fro about the vertical axis in response to a helm, heeling means for heeling the hull about the fore-aft axis in response to a heeling controller, a main sheet and a loading therefor which is responsive to a loading controller.

With the simulator a pupil can learn something of the art of sailing without needing to take a boat on water. He has for manipulation the helm, which is preferably a tiller, and the main sheet as in normal sailing. By the helm he can rotate the hull about the vertical axis in either direction as in sailing, while sensing the pull of the main sheet. The loading of the main sheet and the heeling of the hull about the fore-aft axis are variable by the loading controller and the heeling controller respectively. In one convenient arrangement the heeling controller and loading controller are arranged for operation by an instructor. In another arrangement they are arranged for automatic operation, though this arrangement is not preferred in view of the complexity required especially if the versatility of an instructor is to be imitated.

In order to give the behavior of the helm an improved approach to the behavior of a helm in actual sailing, various refinements are desirable. Firstly, the sensitivity of the helm is preferably made variable by a sensitivity control so that the rate of turn of the hull about the vertical axis is greater for a given deflection at higher supposed speeds of the hull than at lower supposed speeds.

In one convenient arrangement the driving means for driving the hull to and fro about the vertical axis is a motor arranged to be varied in its speed by the resistance in a control circuit, the helm operates a variable resistance in the control circuit, and another variable resistance in the circuit, conveniently calibrated in knots, serves as a sensitivity control. To give the pupil an indication of the supposed speed, the hull may be provided with a speed indicator responsive to the sensitivity control or there may be provided a variable speed fan arranged to provide a wind effect.

Secondly, the stiffness of the helm is preferably variable to simulate the effect of changes of speed and sailing direction on the stiffness. In one convenient arrangement for this purpose, the helm is provided with loading springs which may be tensioned manually by the instructor.

Thirdly, in order to simulate the effects of lee and weather helm, the zero position of the helm, i.e. the position for which the hull does not rotate about the vertical axis, is preferably made variable. When the helm operates a variable resistance, this is conveniently achieved by means for moving the variable resistance relative to the helm.

Advantageously, the heeling means is connected with the hull via a resilient coupling, so that the extent of heeling is responsive to the pupil's position as well as to the heeling controller. With this arrangement the pupil is able, by shifting his position, and when appropriate by hanging out over the gunwale, to assist in balancing the hull.

In the interests of realism the main sheet is preferably connected with a boom via which it is loaded as in actual sailing. The loading is preferably a resilient loading so that the pupil can make the boom move by pulling on the main sheet. Advantageously the resilient loading is adjustable and, because of the magnitude of the forces involved, the adjustment is preferably power operated. In a preferred construction the boom is carried by a mast mounted for rotation and the loading operates via the mast.

The following description of an example of a sailing simulator in accordance with the invention, in which description reference is made to the accompanying diagrammatic drawings, is given by way of illustration.

In the drawings:
FIGURE 1 shows the simulator in plan,
FIGURE 2 shows the simulator in side elevation,
FIGURE 3 shows the driving means for moving the hull of the simulator about its vertical and fore-aft axes,
FIGURE 4 shows the loading for the main sheet,
FIGURE 5 shows details of the helm in plan,
FIGURE 6 shows the electrical circuit associated with the helm, and
FIGURE 7 shows the lay-out of the instructor's control panel.

The simulator has a large cruciform base 1 at the center of which is rotatably mounted a beam 2 which carries a racing hull 3. The hull is pivotally attached at its bow to an upright 4 at one end of the beam 2. At the stern, the hull is bolted to a plate 5 secured to a horizontal axle 6 having a driving pulley 7 connected therewith by a torsionally resilient coupling unit 8.

Mounted upon the beam 2 beneath the stern of the hull is a reversible D.C. electric motor 9 which drives a lead screw 10 having thereon a nut unit 11. A loop of stout wire cable, the ends of which are clamped to the nut, passes round guide pulleys 12, 13 and 14 and the drivinng pulley 7, to the periphery of which it is securely clamped to eliminate slip. As will be appreciated, rotation of the lead screw 10 by the motor causes the nut unit 11 to haul upon the cable and rotate the hull about its fore-aft axis. The motor is caused to run in either direction by a HEEL control upon the instructor's control panel 15. By this control the instructor can apply a required amount of heel, to port or to starboard, up to an amount, 50°, corresponding with capsizing. The resilient coupling unit 8 allows the pupil to reduce the heel by moving his position and, if appropriate, hanging out over the gunwale.

A driving wheel tire 16 mounted at the end of the beam 2 and arranged to have a driving contact with the floor on which the base 1 stands is connected by a belt-drive 17 with another reversible D.C. electric motor 18 responsive to a tiller 19. The tiller is pivoted about a vertical axis located abaft the stern as with a normal tiller connected to a rudder. The after end of the tiller carries a sprocket 20 centered on the axis of the tiller. A short length of sprocket chain 21 passing round the sprocket 20 has its ends connected by springs 22 with a similar length of sprocket chain 23 which passes round a sprocket 24 carried by a fixed mounting (not shown) over the tiller. The sprocket 24 meshes with a small pinion 25 on the control spindle of a variable resistance unit 26 mounted under a bracket 27 which is pivotally mounted about an axis coincident with the axis of the sprocket 24.

As indicated in FIGURE 6 the variable resistance unit is formed from a wire-wound linear potentiometer by removing a short section from the center of the winding. The outer ends of the winding are connected together. Rotation of the spindle by the pinion 25 away from the center point in either direction gives a progressively decreasing resistance.

The field winding of the motor 18 is energized with direct current from a bank of silicon rectifiers (not shown). The armature winding is fed from this bank via a thyristor circuit which includes the variable resistance unit 26. Progressive movement of the tiller from its neutral position, by progressively decreasing the resistance in the thyristor circuit causes the motor 18 to run progressively more rapidly. Accordingly the hull is driven about its vertical axis at a rate which depends upon the movement of the tiller. A reversing microswitch actuated by a cam 127 on the spindle of the variable resistance unit 26 reverses the armature connections of the motor when the wiper blade 28 passes through the centre position. Accordingly, the direction in which the hull is rotated by the motor 18 depends upon the direction in which the tiller is moved as in steering upon water.

On the panel 15 is a rheostat 29 connected in series with the resistance unit 26 and operable by a knob marked KNOTS provided with a scale marked in knots. By this knob the instructor can vary the sensitivity of the system so that a greater rate of turn is obtained for a given movement of the tiller at higher imagined speeds than at lower imagined speeds.

Adjacent to a seat 30 for the instructor is a pair of levers 31 and 32 from which bowden cable 33 and 34 lead to tension springs 35 and 36 connected with the tiller. By manipulating the levers 31 and 32 the instructor is able to simulate the changes in resistance of movement of the tiller experienced in normal sailing. By turning the KNOTS knob to a postion marked "sternway" the instructor is able to reverse the response of the hull to the tiller when teaching certain maneuvers. In this position of the knob, a cam on the rheostat operates a reversing switch for the motor 18.

Reference has already been made to bracket 27 being pivotally mounted. This bracket is movable about its pivot by an actuator 37 connected to the bracket by a link 38. This actuator is controlled by a switch on the panel 15 marked WEATHER HELM having a central off position and two mutually reversed running positions P and S. With this switch the instructor can move the resistance unit 25 relative to the sprocket 24 and thereby change the neutral position of the tiller to give weather helm and a lee helm effects. A meter 39 on the panel 15 is arranged and calibrated to show the amount of weather or lee helm applied.

A main sheet 40 is connected with a boom 41 carried by a mast 42 which can be a short mast as shown or, where there is sufficient headroom, a mast of normal height. This mast is rotatably mounted and has a driving pinion 43 engaged with a rack 44 carried by a plunger 45 which extends into a tube 46 and terminates in an abutment 47. Stout springs 48 and 49 together bias the abutment 47 to a central position within the tube 46. At the end opposite the track 44, the tube 46 is provided with a nut 48 engaged with a lead screw 49 rotatable by a motor 50. The motor 50 has a speed variation and reversing circuit similar to that of motor 18 but without a sensitivity control. The speed and direction of the motor are controlled by a BOOM knob on the panel 15 and by this knob the instructor can swing the boom to port or starboard by any required amount which is indicated by a calibrated meter 41. By hauling upon the main sheet 40 the pupil is able to move the boom inwardly against the spring 48 or the spring 49 depending upon whether the boom is to port or starboard.

The boom motor 50 and associated mechanism are concealed by a bulkhead in the bows of the hull and the mechanism for rotating the hull about its two axes is enclosed by a casing 51, 52.

In the drawings such items as supporting members for the various components are omitted for simplicity.

With the simulator just described with reference to the drawings, a pupil is enabled to learn and practise the principal features of the art of sailing under the guidance of an instructor operating the control panel and levers 31 and 32 to simulate the principal effects of the pupil's actions.

Obviously various departures may be made from the construction herein described without departing from the ambit of the invention. For example, the loading for the main sheet may be provided, with less realistic results, by a simple tension spring. Again, hydraulic motors and controls may be provided in place of the electric motors and controls described.

We claim:

1. A sailing simulator for learning the art of sailing which comprises a mounting, on the mounting a hull unit mounted for rotation to vary the heading of the fore-aft direction thereof with reference to the mounting and also mounted for heeling rotation, a manually movable helm on the hull unit, powered reversible and stoppable driving means responsive to the position of the helm for rotating the hull unit to and fro to vary said heading when said driving means is actuated and holding the heading constant when said driving means is stopped, said helm being movable through a zero position at which the driving means is stopped and the heading is held constant, powered heeling means for heeling the hull in heeling rotation, a boom on the hull unit and mounted to be swung over a pathway extending from one side to the other side of the fore-aft direction of the hull unit, powered reversible and stoppable swinging means for setting the position of the boom on said pathway, a mainsheet for manually pulling the boom from its set position on said pathway towards the fore-aft direction of the hull unit to give it a modified position on said pathway, loading means to oppose said pulling and control means for adjusting the powered heeling means and the swinging means and thereby giving the hull unit degrees of heel and the boom modified positions on its pathway which degrees and modified positions are related to one another, and to headings of the fore-aft direction of the hull unit produced by manually moving the helm, in the manner in which said degrees, modified positions and headings are interrelated with a sailing craft having a hull, a helm, a mainsheet and a boom and a sail affixed to the boom, sailing on water under the effect of a wind of constant strength and direction.

2. A sailing simulator according to claim 1 in which the control means is manually operable and is provided with a manually movable heeling control and a manually movable boom setter.

3. A sailing simulator according to claim 1 in which the control means is manually operable and is provided with manually movable controls for regulating the sensitivity, stiffness and zero position of the helm.

4. A sailing simulator for learning the art of sailing which comprises a hull mounted for rotational movement about a vertical axis and about a fore-aft axis, a manually movable helm on the hull, powered reversible and stoppable driving means responsive to the position of the helm for moving the hull to and fro about a vertical axis when said driving means is actuated and holding the hull free from rotation about said axis when said driving means is stopped, said helm being movable through a zero position at which the hull does not move and means for varying said zero position, a heeling controller, powered heeling means for heeling the hull about the fore-aft axis in response to the heeling controller, an adjustable main sheet, means for loading the main sheet, a loading controller, said loading means being responsive to said controller, the controller being arranged to load the main sheet by an amount of load which is independent of the adjustment of the main sheet and which is variable, said heeling controller and said loading controller being operable to control the heeling means and the main sheet loading means, and thereby simulate the natural heeling and main sheet loading of a sailing craft.

5. A sailing simulator according to claim 4 in which the helm is a tiller.

6. A sailing simulator according to claim 4 in which the driving means is an electric motor and said simulator has a control circuit for the motor and, in the control circuit, a variable resistance arranged to vary the speed of the motor and the sensitivity of the helm.

7. A sailing simulator according to claim 4 having a variable helm loading device for varying the stiffness of the helm.

8. A sailing simulator according to claim 4 having a bodily movable variable resistance variable by moving the helm and wherein the driving means is an electric motor responsive to the helm via the variable resistance and the position of the helm which produces a zero turning effect about the vertical axis by stopping the driving means is variable, to simulate the effects of lee and weather helm, by moving the variable resistance bodily relative to the helm.

9. A sailing simulator according to claim 4 having a resilient coupling via which the heeling means is connected with the hull.

10. A sailing simulator according to claim 4 having a boom to which the main sheet is connected and via which it is loaded by the loading controller.

11. A sailing simulator according to claim 10 having a mast mounted for rotation about its longitudinal axis with respect to the hull, the boom being carried by the mast and the loading operating via the mast.

12. A sailing simulator according to claim 4 in which the loading controller is arranged to load the main sheet in a resilient manner.

13. A sailing simulator according to claim 4 in which the loading controller is arranged to load the main sheet in an adjustably resilient manner.

References Cited

UNITED STATES PATENTS

| | | | |
|---|---|---|---|
| 2,208,083 | 7/1940 | Rousseau | 35—11 |
| 2,293,612 | 8/1942 | Montague | 40—126 |
| 1,613,941 | 1/1927 | Churus | 272—17 |
| 2,519,233 | 8/1950 | Davis et al. | 35—12 |
| 2,695,145 | 11/1954 | Lear et al. | 35—12 |
| 2,782,560 | 2/1957 | Pollnitz | 272—17 |
| 2,855,702 | 10/1958 | Taylor | 35—11 |
| 3,305,943 | 2/1967 | Hansen | 35—11 |

EUGENE R. CAPOZIO, Primary Examiner

WALTER W. NIELSEN, Assistant Examiner